US012699555B2

(12) United States Patent
Jo et al.

(10) Patent No.: US 12,699,555 B2
(45) Date of Patent: Aug. 4, 2026

(54) METHOD AND SYSTEM FOR COMPILING APPLICATIONS

(71) Applicant: MOREH CORP., Seoul (KR)

(72) Inventors: Gangwon Jo, Seoul (KR); Jungho Park, Seoul (KR)

(73) Assignee: MOREH CORP, Seoul (KR)

( * ) Notice: Subject to any disclaimer, the term of this patent is extended or adjusted under 35 U.S.C. 154(b) by 248 days.

(21) Appl. No.: 18/595,822

(22) Filed: Mar. 5, 2024

(65) Prior Publication Data

US 2024/0303053 A1 Sep. 12, 2024

(30) Foreign Application Priority Data

Mar. 6, 2023 (KR) ........................ 10-2023-0029483
Aug. 17, 2023 (KR) ........................ 10-2023-0107446

(51) Int. Cl.
*G06F 9/44* (2018.01)
*G06F 8/41* (2018.01)

(52) U.S. Cl.
CPC .................................. *G06F 8/443* (2013.01)

(58) Field of Classification Search
CPC ....................................................... G06F 8/443
See application file for complete search history.

(56) References Cited

U.S. PATENT DOCUMENTS

| | | | |
|---|---|---|---|
| 12,505,339 B1* | 12/2025 | Diamant | G06N 3/065 |
| 2004/0025152 A1* | 2/2004 | Ishizaki | G06F 8/445 |
| | | | 717/146 |
| 2021/0334298 A1* | 10/2021 | Neumann | G06F 16/3332 |
| 2024/0028886 A1* | 1/2024 | Wang | G06N 20/00 |

* cited by examiner

*Primary Examiner* — Qamrun Nahar
(74) *Attorney, Agent, or Firm* — Banner & Witcoff, Ltd.

(57) ABSTRACT

The disclosure relates to a method for compiling an application, in which the method is executed by one or more processors, and includes initiating generating a first intermediate representation for a first part of an application, while generating the first intermediate representation, stopping generating the first intermediate representation if it is determined that a number of operation nodes included in the first intermediate representation reaches an interval value, and compiling the generated first intermediate representation.

20 Claims, 9 Drawing Sheets

```
1   A = torch . Tensor(...)
2   B = torch . Tensor(...)
3   C = torch . Tensor(...)
4   D = A + B
5   E = D * C
6   D = torch . Tensor(...)
```

300

INTERMEDIATE REPRESENTATION

NUMBER OF
OPERATION NODES 0

310

INTERMEDIATE REPRESENTATION

NUMBER OF
OPERATION NODES 2

320

INTERMEDIATE REPRESENTATION

NUMBER OF
OPERATION NODES 2

330

INTERMEDIATE REPRESENTATION

INTERMEDIATE REPRESENTATION

METHOD AND SYSTEM FOR COMPILING APPLICATIONS

CROSS-REFERENCE TO RELATED APPLICATION

This application claims priority under 35 U.S.C § 119 to Korean Patent Application No. 10-2023-0029483 and No. 10-2023-0107446, filed in the Korean Intellectual Property Office on Mar. 6, 2023 and Aug. 17, 2023, respectively, the entire contents of which are hereby incorporated by reference.

TECHNICAL FIELD

The present disclosure relates to a method and system for compiling an application, and more specifically, to a method and system for generating an intermediate representation until the number of operation nodes included in the intermediate representation reaches an interval value, and compiling the generated intermediate representation.

BACKGROUND

A program may include data and instructions for performing operations on the data. The simplest way to execute the program is to execute given instructions in sequence, but this involves problems such as that optimization techniques cannot be applied because it cannot be executed considering future operations, and that parallelization is difficult.

To solve the problems described above, instead of executing given instructions in sequence, an intermediate representations with the same semantics as the program can be constructed, and the given instructions can be executed after applying optimization techniques and/or performing parallelization to the intermediate representation. The way of executing by optimizing and/or parallelizing the intermediate representations provides an advantage in that resources such as execution time and memory usage can be saved while maintaining the execution result of the program.

In the case of artificial intelligence applications, optimization techniques are applied by generating a graph in model units (unit of a pair of forward propagation-back propagation), but there is a problem that optimization and parallelization may not proceed efficiently because the size of the intermediate representation is not large enough.

SUMMARY

In order to solve one or more problems (e.g., the problems described above and/or other problems not explicitly described herein), the present disclosure provides a method, a non-transitory computer readable recording medium storing instructions, and an apparatus (system) for compiling an application.

The present disclosure may be implemented in a variety of ways, including a method, an apparatus (system), or a non-transitory computer-readable recording medium storing instructions. A method may be performed by a first processor and include initiating generation of a first intermediate representation for a first part of an application, stopping generation of the first intermediate representation, wherein the stopping the generation of the first intermediate representation is based on: a number of operation nodes of the first intermediate representation reaching an interval value while generating the first intermediate representation, or a generation of an operation node corresponding to a predefined operation type, and compiling the generated first intermediate representation.

The method may further include initiating generation of a second intermediate representation for a second part of the application, wherein the first part and the second part are different from each other, stopping, based on a number of operation nodes of the second intermediate representation reaching the interval value while generating the second intermediate representation, generation of the second intermediate representation, and compiling the generated second intermediate representation.

The method may further include sending the compiled first intermediate representation to a second processor, initiating, by the first processor, generation of a second intermediate representation for a second part of the application, wherein the first part and the second part are different from each other, and wherein the generation of the second intermediate representation for the second part is performed during a time in which at least a part of the compiled first intermediate representation is executed by the second processor, and stopping, based on a number of operation nodes of the second intermediate representation reaching the interval value while generating the second intermediate representation, generation of the second intermediate representation.

The method may further include sending the compiled first intermediate representation to a second processor, receiving an execution result for at least a part of the compiled first intermediate representation from the second processor, and initiating generation of a second intermediate representation for a second part of the application, wherein the first part and the second part are different from each other.

An initial value of the interval value may be set to a predetermined maximum value, wherein the predefined operation type may correspond to a response waiting operation, wherein the stopping generation of the first intermediate representation may include in response to the generation of the operation node corresponding to the response waiting operation, changing the interval value to a predetermined minimum value, and wherein the method may further include stopping, based on a number of operation nodes of the second intermediate representation reaching the predetermined minimum value while generating the second intermediate representation, generation of the second intermediate representation.

The method may further include completing generation of a plurality of subsequent intermediate representations for remaining parts of the application, compiling the plurality of subsequent intermediate representations, and sending, the compiled plurality of subsequent intermediate representations, to the second processor for execution by the second processor.

The method may further include until the completing generation of the plurality of subsequent intermediate representations, repeating initiating generation of at least one intermediate representation for at least one part of the application for which no intermediate representation has been generated, stopping the generation of the at least one intermediate representation, the compiling the at least one intermediate representation, and sending the compiled at least one intermediate representation.

An initial value of the interval value may be set to a predetermined maximum value, wherein the stopping the generation of the first intermediate representation may include based on a generation of an operation node corresponding to a response waiting operation included in the application, stopping generation of the first intermediate representation before the number of operation nodes of the first intermediate representation reaching the interval value.

The repeating may include based on a generation of an operation node corresponding to a response waiting operation included in the application, changing the interval value to a predetermined minimum value, and until a second operation node corresponding to the response waiting operation included in the application is generated or until the interval value reaches the predetermined maximum value, whichever is earlier, increasing the interval value in response to completing generation of an intermediate representation for a part of the application.

The increasing the interval value may include increasing the interval value by a predetermined number or by a predetermined ratio.

The method may further include determining the interval value based on an idle time of the second processor.

There is provided a non-transitory computer-readable recording medium storing instructions for executing the method on a computer.

An information processing system may be provided, which may include one or more processors and memory storing instructions that, when executed by the one or more processors, cause the information processing system to initiate generation of a first intermediate representation for a first part of an application, stop generation of the first intermediate representation, wherein stopping the generation of the first intermediate representation is based on: a number of operation nodes of the first intermediate representation reaching an interval value while generating the first intermediate representation, or a generation of an operation node corresponding to a predefined operation type, and compile the generated first intermediate representation.

According to some examples of the present disclosure, instead of generating a graph in a model unit (unit of a pair of forward propagation-back propagation) and compiling an application, it is possible to generate intermediate representations and compile the generated intermediate representations until the number of operation nodes reaches an interval value. Accordingly, optimization and/or parallelization can be effectively performed with limited given resource. Accordingly, applications can be efficiently executed.

According to some examples of the present disclosure, if a response waiting operation is present in the application, by compiling using a small interval value, it is possible to reduce the idle time of resources. Accordingly, it is possible to prevent performance degradation due to a decrease in resource utilization.

According to some examples of the present disclosure, by dynamically changing the interval value according to the characteristics of the application (for example, whether or not response waiting operations are included, frequency of occurrence of response waiting operations, etc.), it is possible to determine the optimal interval value to reduce idle time of resources while efficiently performing optimization and/or parallelization. By compiling using the determined optimal interval value, optimization and/or parallelization can be effectively performed with the limited given resources. Accordingly, applications can be efficiently executed.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
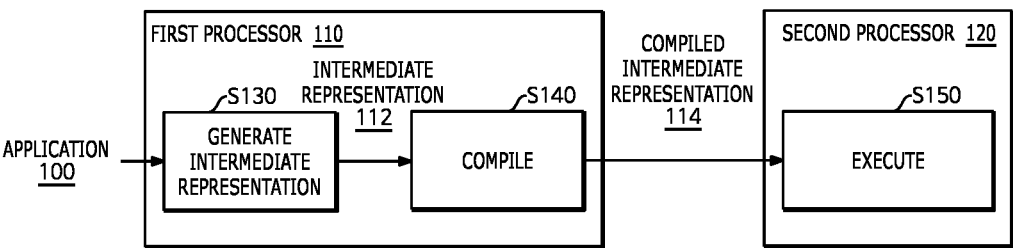
FIG. 1 illustrates an example of a method for compiling an application.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but is not limited thereto. For example, the system may include one or more server devices. In another example, the system may include one or more cloud devices. In still another example, the system may include both the server device and the cloud device operated in conjunction with each other.

In the present disclosure, "each of a plurality of A" may refer to each of all components included in the plurality of A, or may refer to each of some of the components included in a plurality of A.

In the present disclosure, an "intermediate representation" may refer to a graph that is generated to efficiently execute a program and has the same meaning as a program and/or information associated therewith. The intermediate representation may include one or more nodes and one or more edges.

In some examples of the present disclosure, "generating an intermediate representation" or "adding a node or edge to an intermediate representation" may include storing or updating information associated with the intermediate representation in a memory of an information processing system, etc.

In the present disclosure, a "response waiting operation" may include an operation that requires transferring the execution result of an operation executed by a second processor (a processor such as GPU that is mainly responsible for executing the operation) to a first processor (a host processor such as CPU). For example, the response waiting operation may include a pull tensor operation. As a specific example, if the first processor attempts to view (e.g., print, etc.) the execution result of the operation executed by the second processor, an operation by the operation implemented only on the first processor to read the data in the second processor may be included.

FIG. 1 illustrates an example of a method for compiling an application 100. The application 100 may be compiled and executed by one or more processors. The application 100 may refer to any application including data and operations. For example, the application 100 may include a deep learning application. In addition, the data may be implemented in any data type capable of configuring the application 100. For example, the data may include tensor type data, etc.

The application 100 may be compiled by a first processor 110 and executed by a second processor 120. The first processor 110 may generally be a host processor (e.g., CPU) suitable for overall system operation, data pre-processing, data flow coordination, etc., and the second processor 120 may be a processor (e.g., GPU) suitable for big data processing, parallel processing, matrix multiplication, convolution operations, etc., although embodiments are not limited thereto. Each of the first processor 110 and the second processor 120 is shown as one processor, but this is merely for convenience of explanation, and each of the first processor 110 and the second processor 120 may include one or more processors.

For example, the application 100 may be compiled by the first processor 110 and executed by the second processor 120, through the process described below.

First, the first processor 110 may generate an intermediate representation 112 of a first part of the application 100. For example, the first processor 110 may extract information from the application 100 and generate the intermediate representation 112 having the same semantics as the first part of the application 100, at S130. The intermediate representation 112 may be represented in the form of a graph including nodes and edges. For example, the data and operations included in the application 100 may be represented by the nodes, and input/output relationships between the data and the operations may be represented by the edges. A specific example of generating the intermediate representation 112 for the application 100 by the first processor 110 will be described below in detail with reference to FIG. 3.

If it is determined that the number of operation nodes included in the generated intermediate representation reaches an interval value, the first processor 110 may stop generating the intermediate representation and compile the generated intermediate representation 112, at S140. Here, compiling may include optimization and/or parallelization. A specific example of optimizing the intermediate representation 112 by the first processor 110 will be described below in detail with reference to FIG. 4.

The first processor 110 may provide the compiled intermediate representation 114 to the second processor 120. In addition, the second processor 120 may execute the compiled intermediate representation 114, at S150. While the second processor 120 executes the compiled intermediate representation 114, the first processor 110 may generate (S130) the intermediate representation 112 for the part of the application 100 for which the intermediate representation 112 is not generated, compile (S140) the generated intermediate representation, and provide the compiled intermediate representation to the second processor 120. The compiled intermediate representation 114 may be executed by the second processor 120 when the second processor 120 becomes available, at S150. The process may be repeatedly performed.

If the interval value is large, compilation can be performed using a large intermediate representation, and accordingly, optimization and/or parallelization can be performed effectively, and the intermediate representation can be executed more efficiently. However, if the interval value is excessively large, problems such as insufficient memory for storing the intermediate representation, or excessively long compilation time may occur. In particular, if the application 100 includes a response waiting operation, long idle time may be generated, which may cause performance degradation.

Accordingly, according to some examples of the present disclosure, the one or more processors may dynamically change the interval value according to the characteristics of the application 100 (for example, whether or not response waiting operations are included, frequency of occurrence of response waiting operations, etc.) so as to determine the optimal interval value to reduce idle time of resources while efficiently performing optimization and/or parallelization. This will be described in more detail below with reference to FIGS. 5 to 9.

Figure 2:
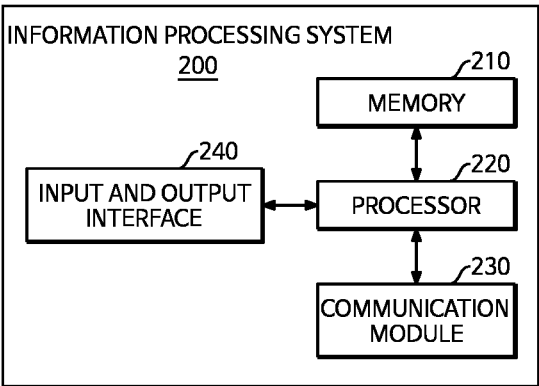
FIG. 2 is a block diagram illustrating an internal configuration of an information processing system.

FIG. 2 is a block diagram illustrating an internal configuration of an information processing system 200. The information processing system 200 may include a memory 210, a processor 220, a communication module 230, and an input and output interface 240. As illustrated in FIG. 2, the information processing system 200 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, and so on. In another example, a non-destructive mass storage device such as ROM, SSD, flash memory, disk drive, and so on may be included in the information processing system 200 as a separate permanent storage device that is distinct from the memory. In addition, the memory 210 may store an operating system and at least one program code (e.g., a code installed and driven in the information processing system 200, for generating an intermediate representation, compiling the same, setting and changing an interval value, etc.)

These software components may be loaded from a computer-readable recording medium separate from the memory 210. Such a separate computer-readable recording medium may include a recording medium directly connectable to the information processing system 200, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for generating an intermediate representation, compiling the same, setting and changing an interval value, etc.) installed by files provided by developers or a file distribution system that distributes application installation files through the communication module 230.

The processor 220 may be configured to process the instructions of the computer program by performing basic arithmetic, logic, and input and output operations. The instructions may be provided to a user terminal (not illustrated) or another external system by the memory 210 or the communication module 230.

The communication module 230 may provide a configuration or function for the user terminal (not illustrated) and the information processing system 200 to communicate with each other through a network, and may provide a configuration or function for the information processing system 200 to communicate with an external system (e.g., a separate cloud system). For example, control signals, instructions, data, etc. provided under the control of the processor 220 of the information processing system 200 may be transmitted to the user terminal and/or the external system through the communication module 230 and the network through the communication module of the user terminal and/or an external system.

In addition, the input and output interface 240 of the information processing system 200 may be a means for interfacing with a device (not illustrated) for inputting or outputting, which may be connected to the information processing system 200 or included in the information processing system 200. In FIG. 2, the input and output interface 240 is illustrated as a component configured separately from the processor 220, but aspects are not limited thereto, and the input and output interface 240 may be configured to be included in the processor 220. The information processing system 200 may include more components than those illustrated in FIG. 2. Meanwhile, most of the related components may not necessarily require exact illustration.

The processor 220 of the information processing system 200 may be configured to manage, process, and/or store the information and/or data received from a plurality of user terminals and/or a plurality of external systems. The first processor may generate and compile an intermediate representation for a part of the application for which no intermediate representation is generated. In addition, the compiled intermediate representation may be provided to the second processor.

Figure 3:
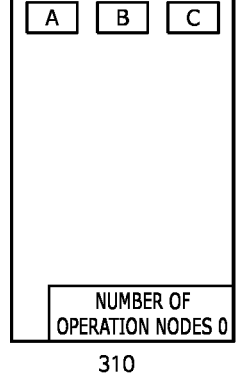
FIG. 3 illustrates an example of a method for generating an intermediate representation for an application.
Figure 3:
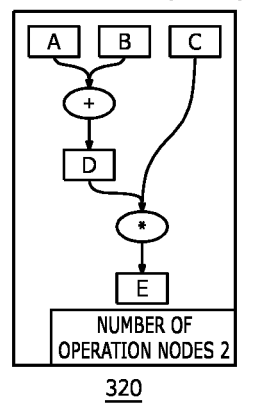
Figure 3:
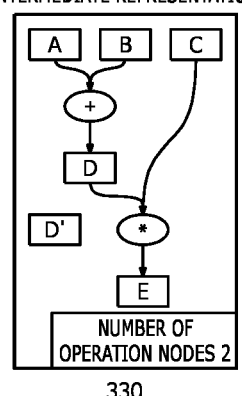

FIG. 3 illustrates an example of a method for generating an intermediate representation for an application.

The first processor may extract, from the application, information on data and information on operation. For example, the first processor may extract from the application the information on data, such as generation of new variables or constants, definition of variables or constant values and changes thereto, data type of variables or constants, size of variables or constants, or deletion or destruction of variables or constants. In addition, the first processor may extract the information on the operation, such as the type of operation being performed, information on input/output data of the operation, parameters of the operation, etc.

The application herein may refer to any application including data and operations. For example, the application may include a deep learning application. In addition, the data may be implemented in any data type capable of configuring a deep learning application. For example, the data may include tensor type data, etc. For example, the first processor may extract information on data type, size of each dimension, etc. from the tensor type data included in the deep learning application.

The first processor may generate an intermediate representation using the information extracted from the application, and store or update the generated intermediate representation. The intermediate representation may be represented in the form of a graph including nodes representing the data and the operations, and edges representing input/output relationships between the data and the operations. The intermediate representation may be stored in a memory of an information processing system, a database, etc., although embodiments are not limited thereto.

For example, the first processor may extract information on the generation of a new tensor in the deep learning application, and may add a data node corresponding to the generated tensor to an intermediate representation. As another example, the first processor may extract the information on operation from the application, add an operation node to the intermediate representation, and add an edge between an input data node corresponding to the extracted input data of the operation and an operation node, and an edge between the operation node and an output data node corresponding to the output data of the operation.

For example, an example of the first processor generating a first intermediate representation for a first part 300 of the application is shown in FIG. 3. For example, an intermediate representation of the first part 300 of the application may be generated through the first to third states 310, 320, and 330. The first state 310 represents an example of a state in which the first processor has generated an intermediate representation for the three lines of the first part 300 of the application. The first processor may extract information on tensors A, B, and C newly generated from the first part 300, and add data nodes A, B, and C corresponding thereto to the intermediate representation. In the first state 310, the number of operation nodes may be zero.

The second state 320 represents an example of a state after the first state 310, in which the first processor has generated an intermediate representation for the five lines of the first part 300 of the application. The first processor may extract information on operation "+" from the fourth line of the first part 300 of the application, and add, to the intermediate representation, an operation node "+", a data node D corresponding to the output data (tensor D) of the operation, and three edges representing the input/output relationship of the operation "+". In addition, the first processor may extract information on operation "*" from the fifth line of the first part 300 of the application, and add, to the intermediate representation, an operation node "*", a data node E corresponding to the output data (tensor E) of the operation, and three edges representing the input/output relationship of the operation "*". In the second state 320, the number of operation nodes may be two.

The third state 330 represents an example of a state after the second state 320, in which an intermediate representation for the six lines of the first part 300 of the application is generated. The first processor may extract information on update of the tensor D to a new tensor in the sixth line of the first part 300 of the application and add a data node D' corresponding to the updated tensor D to the intermediate representation. In the third state 330, the number of operation nodes may be two. The first processor may generate an intermediate representation until the number of operation nodes included in the intermediate representation reaches an interval value.

As described above, instead of executing the instructions of the application in sequence, by constructing an intermediate representation for the application, and applying optimization and/or parallelism to the intermediate representation and executing the same, it is possible to reduce execution time or memory usage while maintaining execution results.

Figure 4:
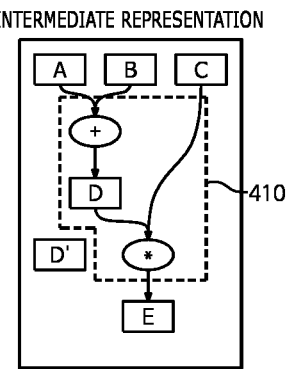
FIG. 4 illustrates an example of a method for optimizing at least a part of an intermediate representation.
Figure 4:
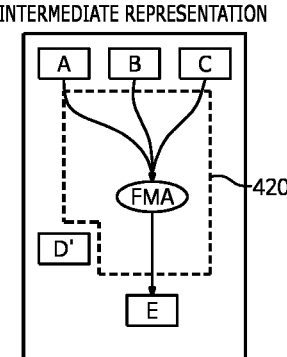

FIG. 4 illustrates an example of a method for optimizing at least a part of an intermediate representation. The first processor may compile the generated intermediate representation. For example, the first processor may optimize and/or parallelize the generated intermediate representation.

For example, an example of optimizing a part of the generated intermediate representation by the first processor is shown in FIG. 4. As shown, the first processor may perform operation fusion of converting a partial graph 410 including the operation node "+" and the operation node "*" of the intermediate representation into a partial graph 420 including one operation node "Fused Multiply-Add (FMA)". In addition, the first processor may optimize the intermediate representation using various optimization techniques.

In this way, by applying the optimization to the intermediate representation and executing the same, it is possible to reduce the execution time or memory usage while maintaining the execution result. For example, if the optimized intermediate representation is executed using the second processor, by fusing and executing a plurality of operations as a single operation, it is possible to reduce memory access and thus improve performance.

Figure 5:
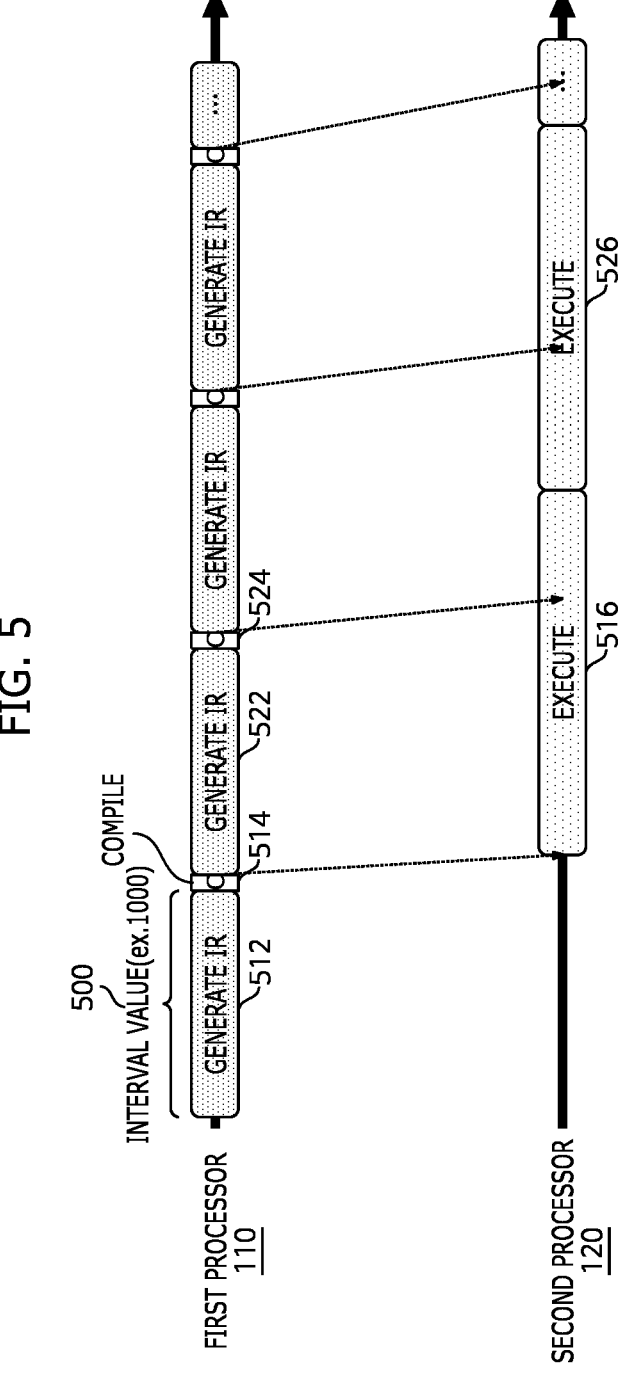
FIG. 5 illustrates an example of a method for compiling an application.

FIG. 5 illustrates an example of a method for compiling an application.

The first processor 110 may initiate generating (512) a first intermediate representation for a first part of the application. If it is determined that the number of operation nodes included in the first intermediate representation reaches an interval value 500 (e.g., 1000, in the example shown) during the generation (512) of the first intermediate representation, the first processor 110 may stop generating (512) the first intermediate representation and compile (514) the generated first intermediate representation. The first processor 110 may provide the compiled first intermediate representation to the second processor 120. The second processor 120 may execute (516) the provided compiled first intermediate representation.

The first processor 110 may initiate generating (522) a second intermediate representation for a second part of the application. The generation (522) of the second intermediate representation may be performed simultaneously with the execution (516) of at least a part of the first intermediate representation by the second processor 120. If it is determined that the number of operation nodes included in the second intermediate representation reaches the interval value 500 during the generation (522) of the second intermediate representation, the first processor 110 may stop generating (522) the second intermediate representation and compile (524) the generated second intermediate representation. The first processor 110 may provide the compiled second intermediate representation to the second processor 120. After the execution (516) of the compiled first intermediate representation is completed, the second processor 120 may execute (526) the compiled second intermediate representation. Such a process may be repeatedly performed until all of the applications are compiled and executed.

If the interval value 500 is large, compilation can be performed using a large intermediate representation, and accordingly, optimization and/or parallelization can be performed effectively, and the intermediate representation can be executed more efficiently. However, if the interval value 500 is excessively large, problems such as insufficient memory for storing the intermediate representation, or excessively long compilation time may occur. Instead of generating a graph in a model unit (unit of a pair of forward propagation-back propagation) and compiling the application, as described above, it is possible to specify the interval value 500, and generate the intermediate representation until the number of operation nodes reaches the interval value 500 and compile the generated intermediate representation. Accordingly, it is possible to perform optimization and/or parallelization effectively under the limitation of given resources. Accordingly, applications can be efficiently executed.

Figure 6:
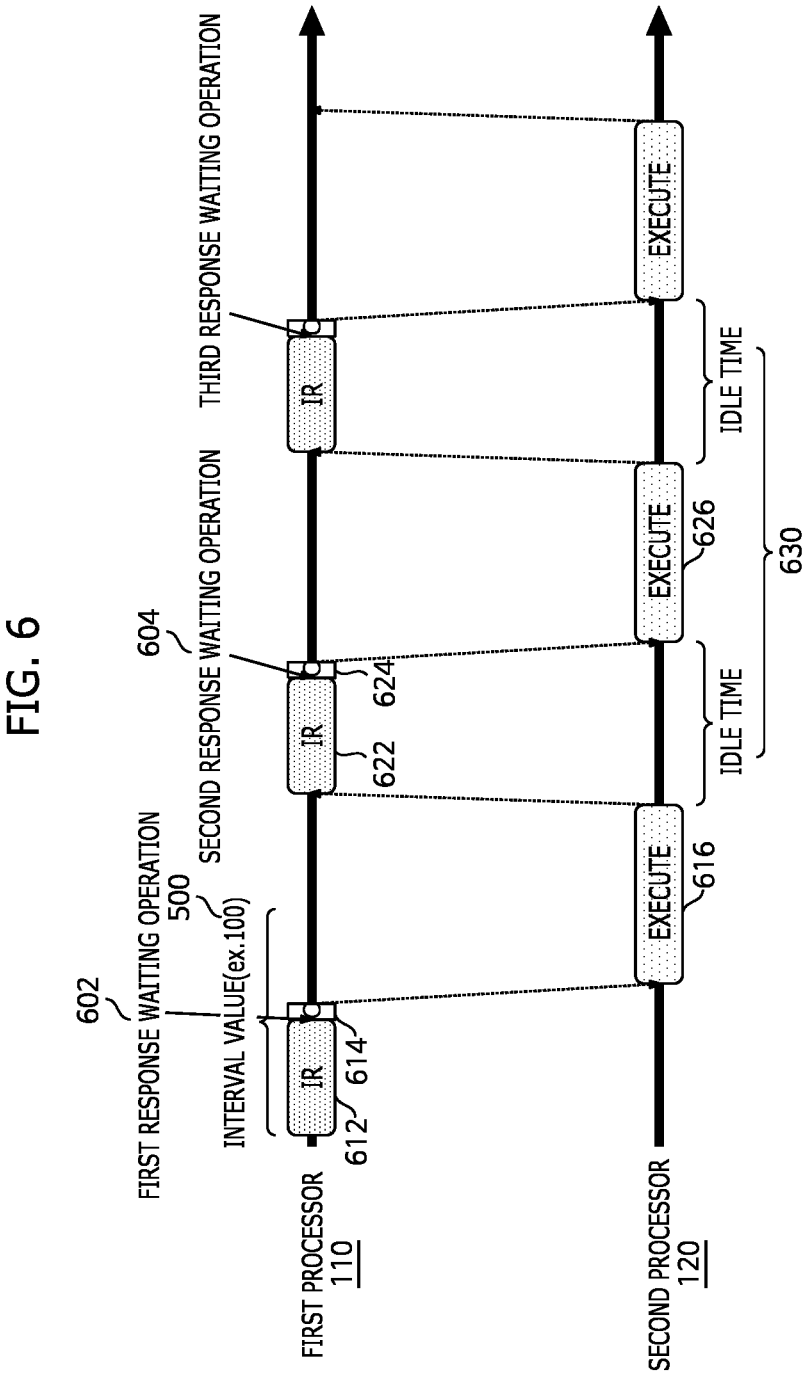
FIG. 6 illustrates an example of a method for compiling an application including response waiting operations.

FIG. 6 illustrates an example of a method for compiling an application including response waiting operations 602 and 604. The response waiting operations 602 and 604 may include an operation that requires to transfer the execution result of the operation executed by the second processor 120 to the first processor 110. For example, the response waiting operations 602 and 604 may include a pull tensor operation. As a specific example, if the first processor 110 attempts to view (e.g., print, etc.) the execution result of the operation executed by the second processor 120, an operation by the operation implemented only on the first processor 110 to read the data in the second processor 120 may be included.

While generating (612) a first intermediate representation for the first part of the application, in response to generating an operation node corresponding to the first response waiting operation 602, the first processor 110 may stop generating (612) the first intermediate representation even if the number of operation nodes included in the first intermediate representation does not reach the interval value 500. The first processor 110 may compile (614) the generated first intermediate representation and provide the compiled first intermediate representation to the second processor 120. The second processor 120 may execute (616) the compiled first intermediate representation and provide an execution result of the first intermediate representation to the first processor 110.

After receiving an execution result of the first intermediate representation from the second processor 120, the first processor 110 may initiate generating (622) the intermediate representation for the second part of the application. While generating (622) a second intermediate representation for the second part of the application, in response to generating an operation node corresponding to the second response waiting operation 604, the first processor 110 may stop generating (622) the second intermediate representation even if the number of operation nodes included in the second intermediate representation does not reach the interval value 500. The first processor 110 may compile (624) the generated second intermediate representation and provide the compiled second intermediate representation to the second processor 120. The second processor 120 may execute (626) the compiled second intermediate representation and provide an execution result of the second intermediate representation to the first processor 110. Such a process may be repeatedly performed until all of the applications are compiled and executed.

As described above, if the response waiting operations 602 and 604 are present in the application, the first processor 110 may receive the execution result by the second processor 120 before initiating generating an intermediate representation for the next part. Accordingly, an idle time 630 of the second processor 120 occurs between the second processor 120 completing executing the previous intermediate representation and receiving and initiating executing the next intermediate representation. If the interval value 500 is large, it may take a long time until the next intermediate representation is provided since the completion of execution of the previous intermediate representation, and accordingly, the idle time 630 of the second processor 120 may be long. Accordingly, utilization of the second processor 120 may be reduced, resulting in performance degradation. Accordingly, if the response waiting operations 602 and 604 are present in the application, the operations may be compiled using a small interval value.

Figure 7:
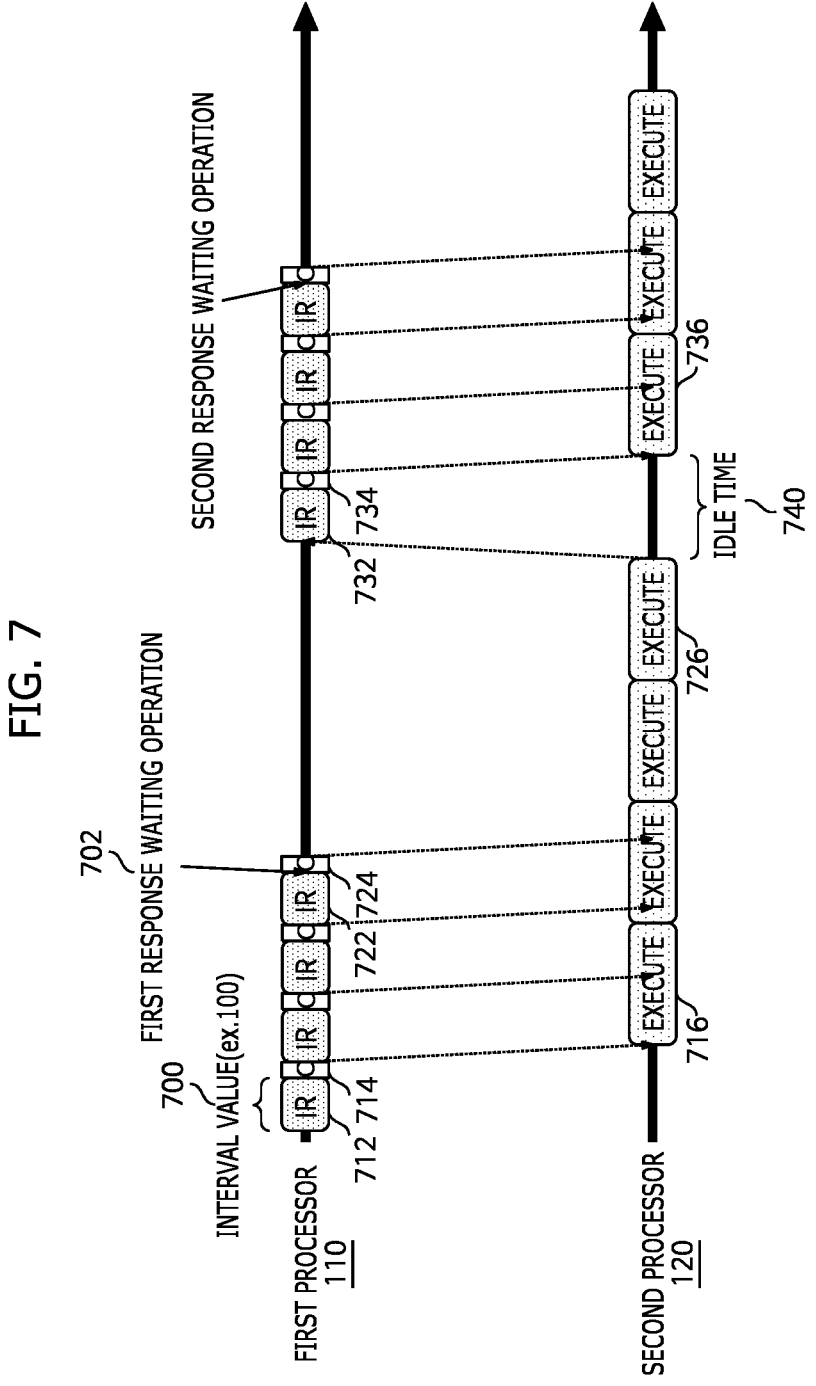
FIG. 7 illustrates an example of a method for compiling an application including response waiting operations using a reduced interval value.

FIG. 7 illustrates an example of a method for compiling an application including response waiting operations using a reduced interval value 700.

The first processor 110 may initiate generating (712) an intermediate representation for a first part of the application. If it is determined that the number of operation nodes included in the first intermediate representation reaches the interval value 700 during the generation (712) of the first intermediate representation, the first processor 110 may stop the generating (712) the first intermediate representation and compile (714) the generated first intermediate representation. The interval value 700 may be a reduced interval value 700 (e.g., 100, in the illustrated example). The first processor 110 may provide the compiled first intermediate representation to the second processor 120. The second processor 120 may execute (716) the provided compiled first intermediate representation.

The first processor 110 may generate, compile, and provide a second intermediate representation for a second part of the application, and generate, compile, and provide a third intermediate representation for a third part of the application. Since the reduced interval value 700 is used, the response waiting operation 702 may not be included in the first to third parts of the application.

The first processor 110 may initiate generating (722) a fourth intermediate representation for a fourth part of the application. While generating (722) the fourth intermediate representation, in response to generating an operation node corresponding to the first response waiting operation 702, the first processor 110 may stop generating (722) the fourth intermediate representation even if the number of operation nodes included in the fourth intermediate representation does not reach the interval value 700. The first processor 110 may compile (724) the generated fourth intermediate representation and provide the compiled fourth intermediate representation to the second processor 120.

After completing executing the first, second, and third intermediate representations in sequence, the second processor 120 may execute (726) the fourth intermediate representation and provide the execution result of the fourth intermediate representation to the first processor 110.

After receiving the execution result of the fourth intermediate representation, the first processor 110 may initiate generating (732) an intermediate representation for a fifth part of the application. If it is determined that the number of operation nodes included in the fifth intermediate representation reaches the interval value 700 during the generation (732) of the fifth intermediate representation, the first processor 110 may stop generating (732) the fifth intermediate representation and compile (734) the generated fifth intermediate representation. The first processor 110 may provide the compiled fifth intermediate representation to the second processor 120. The second processor 120 may execute (736) the provided compiled fifth intermediate representation.

Since the reduced interval value 700 (100, in the example shown) is used as the interval value 700, it is possible to reduce the idle time 740 of the second processor 120 between the second processor 120 completing executing (726) the previous intermediate representation, and receiving and initiating executing (736) the next intermediate representation.

The first processor 110 may dynamically change the interval value according to the characteristics of the application (for example, whether or not response waiting operations are included, frequency of occurrence of response waiting operations, etc.) so as to determine the optimal interval value to reduce the idle time 740 of resources while efficiently performing optimization and/or parallelization.

For example, the first processor 110 may start generating an intermediate representation of the application in a state where the initial value of the interval value is set to a predetermined maximum value. While generating the intermediate representation for the application, the first processor 110 may change the interval value to a predetermined minimum value, if an operation node corresponding to a response waiting operation is generated. Until an operation node corresponding to another response waiting operation is generated or until the interval value reaches the predetermined maximum value, whichever is earlier, the first processor 110 may increase the interval value in response to completing generating the intermediate representation for at least a part of the application. A specific example in which the first processor 110 dynamically changes the interval value and determines the optimal interval value will be described in more detail below with reference to FIG. 9.

The optimal interval value may be determined based on the idle time of the second processor according to the interval value. For example, the idle time of the second processor 120 according to the change in the interval value may be recorded, and the first processor 110 may determine an optimal interval value for minimizing the idle time of the second processor 120 based on this record. The interval value may be determined as a fixed value or as a changing pattern of values.

Figure 8:
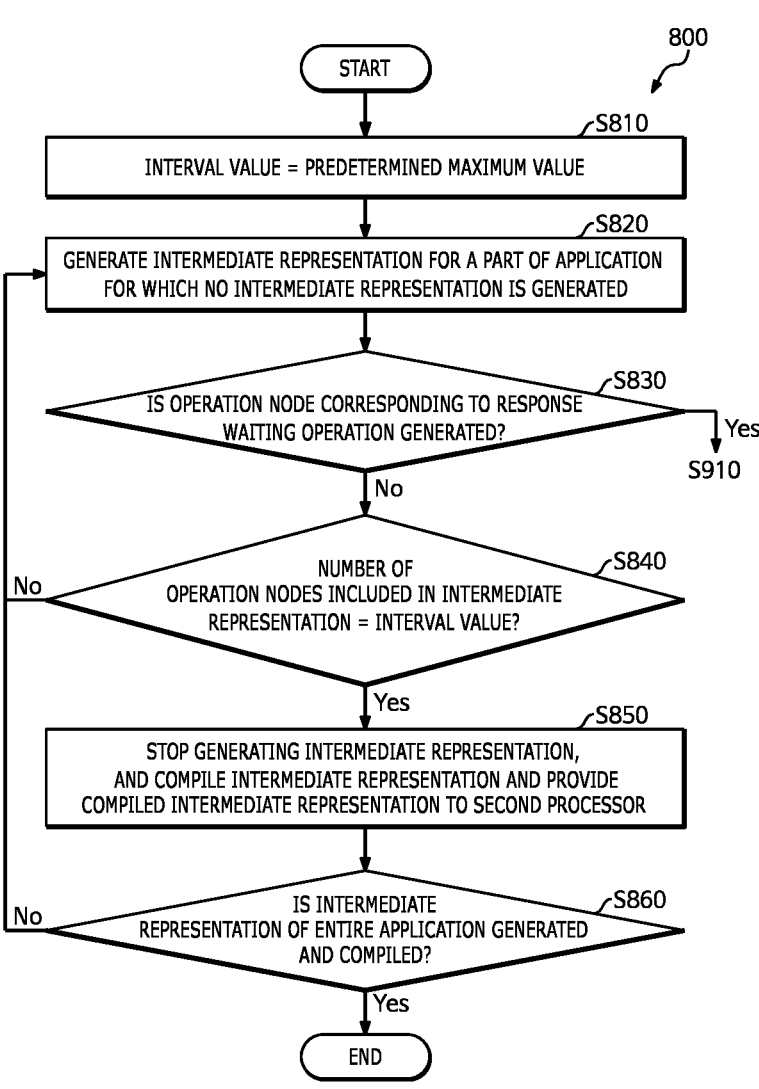
FIG. 8 is a flowchart illustrating an example of a method for compiling an application.

FIG. 8 is a flowchart illustrating an example of a method 800 for compiling an application. The method 800 may be performed by the first processor (one or more processors). With the interval value set to a predetermined maximum value (e.g., 1000), the method may be initiated, at S810.

The first processor may generate an intermediate representation for a part of the application for which no intermediate representation is generated, at S820. While generating the intermediate representation, the first processor may determine whether or not an operation node corresponding to a response waiting operation is generated, at S830. If it is determined that the operation node corresponding to the response waiting operation is not generated, the process may proceed to S840. In contrast, if it is determined that the operation node corresponding to the response waiting operation is generated, the process may proceed to S910. Processes following S910 for an example of a case where it is determined that an operation node corresponding to the response waiting operation is generated will be described below with reference to FIG. 9.

While generating the intermediate representation, the first processor may determine whether or not the number of operation nodes included in the intermediate representation reaches an interval value (e.g., the interval value set to the predetermined maximum value), at S840. If it is determined that the number of operation nodes included in the intermediate representation does not reach the interval value, the first processor may continue generating the intermediate representation. In contrast, if it is determined that the number of operation nodes included in the intermediate representation reaches the interval value, the first processor may stop generating the intermediate representation, compile the generated intermediate representation, and provide the compiled intermediate representation to the second processor, at S850. The compiled intermediate representation provided to the second processor may be executed by the second processor.

The first processor may determine whether or not generating and compiling the intermediate representation for the entire application are completed, at S860. If it is determined that the generating and compiling the intermediate representation for the entire application are not completed, the first processor may return to S820 and the first processor may generate an intermediate representation for the part of the application for which no intermediate representation is generated, and the process described above may be repeated. Generating and/or compiling the intermediate representation by the first processor may be performed simultaneously with executing the compiled intermediate representation by the second processor. In contrast, if it is determined that generating and compiling the intermediate representation for the entire application are completed, the method 800 may end.

Figure 9:
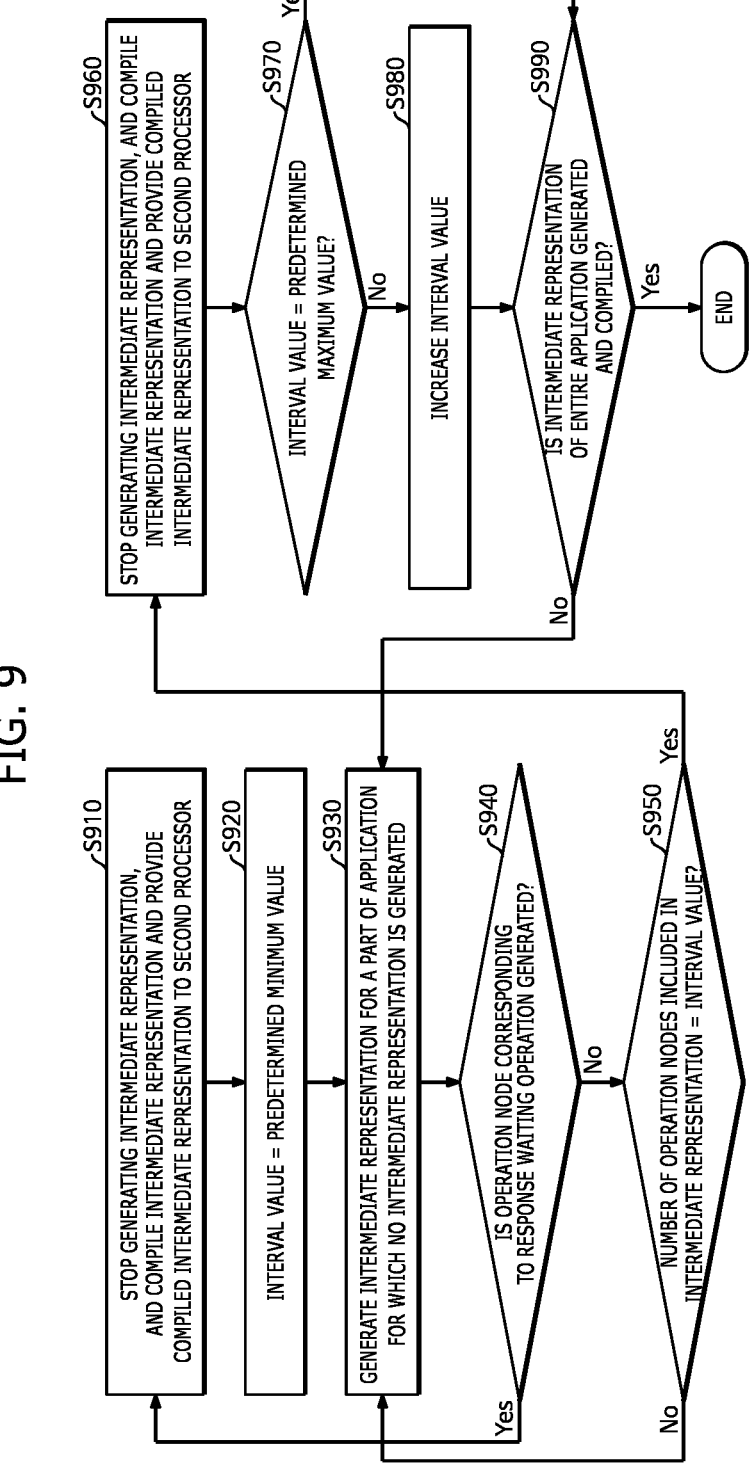
FIG. 9 is a flowchart illustrating an example of a method for compiling an application including a response waiting operation.

FIG. 9 is a flowchart illustrating an example of a method for compiling an application including a response waiting operation.

The first processor may dynamically change the interval value according to the characteristics of the application (for example, whether or not response waiting operations are included, frequency of occurrence of response waiting operations, etc.) so as to determine the optimal interval value to reduce idle time of resources while efficiently performing optimization and/or parallelization. As a specific example, the interval value may be determined by the following method.

While generating an intermediate representation for the application, the first processor may generate an operation node corresponding to a response waiting operation included in the application. In this case, in response to generating an operation node corresponding to the response waiting operation, the first processor may stop generating the intermediate representation, compile the generated intermediate representation, and provide the generated intermediate representation to the second processor, even if the number of operation nodes included in the intermediate representation does not reach the interval value, at S910. The compiled intermediate representation provided to the second processor may be executed by the second processor.

Additionally, in response to generating an operation node corresponding to the response waiting operation, the first processor may change the interval value to a predetermined minimum value (e.g., 100), at S920.

The first processor may generate an intermediate representation for the part of the application for which no intermediate representation is generated, at S930. Generating the intermediate representation by the first processor may be performed simultaneously with executing the compiled intermediate representation by the second processor.

While generating an intermediate representation, the first processor may determine whether or not an operation node corresponding to a response waiting operation is generated, at S940. If it is determined that the operation node corresponding to the response waiting operation is not generated, the process may proceed to S950. In contrast, if it is determined that the operation node corresponding to the response waiting operation is generated, in response to generating an operation node corresponding to the response waiting operation, the first processor may return to S910 and stop generating the intermediate representation, compile the generated intermediate representation, and provide the generated intermediate representation to the second processor, even if the number of operation nodes included in the intermediate representation does not reach the interval value. The process described above may be repeatedly performed.

While generating the intermediate representation, the first processor may determine whether or not the number of operation nodes included in the intermediate representation reaches the interval value, at S950. If it is determined that the number of operation nodes included in the intermediate representation does not reach the interval value, the first processor may continue generating the intermediate representation. In contrast, if it is determined that the number of operation nodes included in the intermediate representation reaches the interval value (e.g., the changed interval value in S920 or increased interval value (described below) in S980), the first processor may stop generating the intermediate representation, compile the generated intermediate representation, and provide the generated intermediate representation to the second processor, at S960. The compiled intermediate representation provided to the second processor may be executed by the second processor.

After S960, that is, when no operation node corresponding to the response waiting operation is generated so that the generation of the intermediate representation with the number of operation nodes included in the intermediate representation reaching the interval value is completed, the first processor may determine whether or not the interval value is the predetermined maximum value, at S970.

If it is determined that the interval value is not the predetermined maximum value, the first processor may increase the interval value, at S980. For example, the first processor may increase the interval value by a predetermined number (e.g., by 10). As another example, the first processor may increase the interval value by a predetermined ratio (e.g., by 10%). If the interval value exceeds the predetermined maximum value when increased by the predetermined number or predetermined ratio, the first processor may change the interval value to the predetermined maximum value. In contrast, if it is determined that the interval value is the predetermined maximum value, the first processor may not increase the interval value.

The first processor may determine whether or not generating and compiling the intermediate representation for the entire application are completed, at S990. If it is determined that the generating and compiling the intermediate representation for the entire application are not completed, the first processor may return to S930 and the first processor may generate an intermediate representation for the part of the application for which no intermediate representation is generated, and the process described above may be repeated.

The optimal interval value may be determined based on the idle time of the second processor according to the interval value. For example, the idle time of the second processor according to the change in the interval value may be recorded, and the first processor may determine an optimal interval value for minimizing the idle time of the second processor based on this record. The interval value may be determined as a fixed value or as a changing pattern of values.

If it is determined that generating and compiling the intermediate representation for the entire application are completed, the method may end.

The flow charts of FIGS. 8 and 9 and the description described above are merely one example of the present disclosure, and may be implemented in other ways. For example, according to some examples, one or more steps of operations may be added/deleted/changed, or the order of each step may be changed.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by a first processor, the method comprising:
initiating generation of a first intermediate representation for a first part of an application;
stopping generation of the first intermediate representation, wherein the stopping the generation of the first intermediate representation is based on:
a number of operation nodes of the first intermediate representation reaching an interval value while generating the first intermediate representation; or
a generation of an operation node corresponding to a predefined operation type;
compiling the generated first intermediate representation;
initiating generation of a second intermediate representation for a second part of the application different from the first part of the application, wherein the generation of the second intermediate representation for the second part is performed during a time in which at least a part of the compiled first intermediate representation is executed by a second processor; and
stopping, based on a number of operation nodes of the second intermediate representation reaching the interval value while generating the second intermediate representation, generation of the second intermediate representation.

2. The method according to claim 1, further comprising: compiling the generated second intermediate representation.

3. The method according to claim 1, further comprising:
sending the compiled first intermediate representation to the second processor.

4. The method according to claim 1, further comprising:
sending the compiled first intermediate representation to the second processor; and
receiving an execution result for at least a part of the compiled first intermediate representation from the second processor.

5. The method according to claim 4, wherein an initial value of the interval value is set to a predetermined maximum value,
wherein the predefined operation type corresponds to a response waiting operation,
wherein the stopping generation of the first intermediate representation comprises: in response to the generation of the operation node corresponding to the response waiting operation, changing the interval value to a predetermined minimum value, and
wherein the method further comprises: stopping, based on a number of operation nodes of the second intermediate representation reaching the predetermined minimum value while generating the second intermediate representation, generation of the second intermediate representation.

6. The method according to claim 4, further comprising:
completing generation of a plurality of subsequent intermediate representations for remaining parts of the application;
compiling the plurality of subsequent intermediate representations; and
sending the compiled plurality of subsequent intermediate representations, to the second processor for execution by the second processor.

7. The method according to claim 6, further comprising:
until the completing generation of the plurality of subsequent intermediate representations, repeating initiating generation of at least one intermediate representation for at least one part of the application for which no intermediate representation has been generated, stopping the generation of the at least one intermediate representation, the compiling the at least one intermediate representation, and sending the compiled at least one intermediate representation.

8. The method according to claim 7, wherein an initial value of the interval value is set to a predetermined maximum value,
wherein the stopping the generation of the first intermediate representation comprises: based on a generation of an operation node corresponding to a response waiting operation included in the application, stopping generation of the first intermediate representation before the number of operation nodes of the first intermediate representation reaching the interval value.

9. The method according to claim 7, wherein the repeating comprises:
based on a generation of an operation node corresponding to a response waiting operation included in the application, changing the interval value to a predetermined minimum value; and
until a second operation node corresponding to the response waiting operation included in the application is generated or until the interval value reaches a predetermined maximum value, whichever is earlier, increasing the interval value in response to completing generation of an intermediate representation for a part of the application.

10. The method according to claim 9, wherein the increasing the interval value comprises increasing the interval value by a predetermined number or by a predetermined ratio.

11. The method according to claim 3, further comprising determining the interval value based on an idle time of the second processor.

12. An information processing system, comprising:

one or more processors; and memory storing instructions that, when executed by the one or more processors, cause the information processing system to:

initiate generation of a first intermediate representation for a first part of an application;

stop generation of the first intermediate representation, wherein stopping the generation of the first intermediate representation is based on:

a number of operation nodes of the first intermediate representation reaching an interval value while generating the first intermediate representation; or a generation of an operation node corresponding to a predefined operation type; and compile the generated first intermediate representation;

initiate generation of a second intermediate representation for a second part of the application different from the first part of the application, wherein the generation of the second intermediate representation for the second part is performed during a time in which at least a part of the compiled first intermediate representation is executed by a second processor; and stop, based on a number of operation nodes of the second intermediate representation reaching the interval value while generating the second intermediate representation, generation of the second intermediate representation.

13. The information processing system according to claim 12, wherein the instructions, when executed by the one or more processors, further cause the information processing system to:

compile the generated second intermediate representation.

14. The information processing system according to claim 12, wherein the instructions, when executed by the one or more processors, further cause the information processing system to:

send the compiled first intermediate representation to the second processor.

15. The information processing system according to claim 12, wherein the instructions, when executed by the one or more processors, further cause the information processing system to:

send the compiled first intermediate representation to the second processor; and receive an execution result for at least a part of the compiled first intermediate representation from the second processor.

16. The information processing system according to claim 15, wherein an initial value of the interval value is set to a predetermined maximum value, wherein the predefined operation type corresponds to a response waiting operation, wherein the stopping generation of the first intermediate representation comprises: in response to the generation of the operation node corresponding to the response waiting operation, changing the interval value to a predetermined minimum value, and wherein the instructions, when executed by the one or more processors, further cause the information processing system to stop, based on a number of operation nodes of the second intermediate representation reaching the predetermined minimum value while generating the second intermediate representation, generation of the second intermediate representation.

17. The information processing system according to claim 15, wherein the instructions, when executed by the one or more processors, further cause the information processing system to:

complete generation of a plurality of subsequent intermediate representations for remaining parts of the application;

compile the plurality of subsequent intermediate representations; and send the compiled plurality of subsequent intermediate representations to the second processor for execution by the second processor.

18. One or more non-transitory computer-readable media storing instructions that, when executed by one or more processors of a computing device, cause the computing device to:

initiate generation of a first intermediate representation for a first part of an application;

stop generation of the first intermediate representation, wherein stopping the generation of the first intermediate representation is based on:

a number of operation nodes of the first intermediate representation reaching an interval value while generating the first intermediate representation; or a generation of an operation node corresponding to a predefined operation type;

compile the generated first intermediate representation;

initiate generation of a second intermediate representation for a second part of the application different from the first part of the application, wherein the generation of the second intermediate representation for the second part is performed during a time in which at least a part of the compiled first intermediate representation is executed by a second processor; and stop, based on a number of operation nodes of the second intermediate representation reaching the interval value while generating the second intermediate representation, generation of the second intermediate representation.

19. The one or more non-transitory computer-readable media according to claim 18, wherein the instructions, when executed by the one or more processors, further cause the computing device to:

compile the generated second intermediate representation.

20. The one or more non-transitory computer-readable media according to claim 18, wherein the instructions, when executed by the one or more processors, further cause the computing device to:

send the compiled first intermediate representation to the second processor.

* * * * *